United States Patent [19]

Greene et al.

[11] Patent Number: 5,506,925
[45] Date of Patent: Apr. 9, 1996

[54] RADIOLYTIC MODIFICATION OF BIREFRINGENCE IN SILICA PLANAR WAVEGUIDE STRUCTURES

[75] Inventors: Benjamin I. Greene, Westfield; Thomas A. Strasser, Chatham; Cynthia A. Volkert, Murray Hill, all of N.J.

[73] Assignee: AT&T Corp., Murray Hill, N.J.

[21] Appl. No.: 396,023

[22] Filed: Feb. 28, 1995

[51] Int. Cl.$^6$ .......................... G02B 6/10; C03B 37/023
[52] U.S. Cl. ........................ 385/129; 385/14; 385/130; 385/131; 385/142; 385/144; 65/385; 65/386
[58] Field of Search ................................ 385/14, 11, 31, 385/39, 50, 123, 126, 129, 130, 131, 132, 141, 142, 144; 65/385, 386, 394, 396, 400

[56] References Cited

U.S. PATENT DOCUMENTS

| | | | |
|---|---|---|---|
| 3,839,067 | 10/1974 | Sosnowski et al. | 385/130 X |
| 4,298,245 | 11/1981 | Aulich et al. | 385/129 X |
| 4,781,424 | 11/1988 | Kawachi et al. | 385/132 X |
| 4,900,112 | 2/1990 | Kawachi et al. | 385/130 X |
| 5,031,983 | 7/1991 | Dillon, Jr. et al. | 372/703 |
| 5,082,349 | 1/1992 | Cordova-Plaza et al. | 385/2 |
| 5,146,533 | 9/1992 | Bierlein et al. | 385/141 |
| 5,266,092 | 11/1993 | Bierlein et al. | 65/3.14 |
| 5,293,436 | 3/1994 | Diemeer | 385/11 |
| 5,341,444 | 8/1994 | Henry et al. | 385/11 |

OTHER PUBLICATIONS

"Photosensitivity in Phosphorus–Doped Silica Glass and Optical Waveguides", B. Malo et al., *Applied Physics Letters*, vol. 65, No. 4, 25 Jul. 1994, pp. 394–396.
"Decay of Ultraviolet–Induced Fiber Bragg Gratings", T. Erdogan et al., *Journal of Applied Physics*, vol. 76, No. 1, 1 Jul. 1994, pp. 73–80.
"High Reflectivity Fibre Gratings Produced By Incubated Damage Using a 193 nm ArF laser", P. E. Dyer, et al., *Electronics Letters*, vol. 30, No. 11, May 26, 1994, pp. 860–862.
"Single–Frequency Er$^{3+}$ doped silica–based planar waveguide laser with integrated photo–imprinted Bragg reflectors", Kitagawa et al., *Electronics Letters*, vol. 30, No. 16, 4 Aug. 1994, pp. 1311–1312.
"Increase In Photosensitivity In Silica–Based Optical Waveguides On Silicon", Y. Hibino et al., *Electronics Letters*, vol. 29, No. 7, 1 Apr. 1993, pp. 621–623.
"Stress–birefringence reduction in elliptical–core fibers under ultraviolet radiation", D. Wong et al., *Optics Letters*, vol. 17, No. 24, Dec. 15, 1992, pp. 1773–1775.
"Stress And Plastic Flow In Silicon During Amorphization By Ion Bombardment", C. A. Volkert, *Journal of Applied Physics*, vol. 70, No. 7, 1 Oct. 1991, pp. 3521–3527.
"Effects of Excimer Laser Irradiation On The Transmission, Index Of Refraction, and Density Of Ultraviolet Grade Fused Silica", Rothschild et al., *Applied Physics Letters*, vol. 55, No. 13, 25 Sep. 1989, pp. 1276–1278.
"Radiation Effects in Hydrogen–Impregnated Vitreous Silica", J. E. Shelby, *Journal of Applied Physics*, vol. 50, No. 5, May 1979, pp. 3702–3706.
*Ion Implantation Range Data For Silicon and Germanium Device Technologies*, B. Smith, Forest Grove, Oregon, U.S.A. Research Studies Press, Inc.

Primary Examiner—Brian Healy
Attorney, Agent, or Firm—S. H. Mayer; H. T. Brendzel

[57] ABSTRACT

A method for reducing birefringence in a silicate waveguide structure having a waveguide core and cladding includes the step of selecting an irradiation energy that induces compaction in the cladding. The waveguide structure is then irradiated with radiation having an energy equal to the irradiation energy to induce a reduction in birefringence.

34 Claims, 6 Drawing Sheets

RADIOLYTIC MODIFICATION OF BIREFRINGENCE IN SILICA PLANAR WAVEGUIDE STRUCTURES

TECHNICAL FIELD

This invention relates to silica waveguide structures and, more particularly, to a silica waveguide structure in which birefringence is reduced by irradiation.

BACKGROUND OF THE INVENTION

Optical devices formed from doped silica planar waveguides are typically fabricated by depositing silica layers having differing dopants on a substrate. A significant problem with these devices is that strain birefringence arises because the various layers have different thermal expansion coefficients that cause large strains once the device returns to ambient temperature after undergoing annealing during the fabrication process. Birefringence is defined in terms of the principle indices of refraction $n_{TE}$ and $n_{TM}$ respectively experienced by the TE and TM modes of an optical signal. More specifically, the birefringence is equal to the difference between the refractive indices and thus is zero when the two refractive indices are equal. While numerous factors contribute to birefringence, strain induced birefringence is believed to be by far the largest component in planar silica devices.

Optical devices are often required to perform in a manner insensitive to the polarization state of the input optical signal. Strain induced birefringence in silica waveguide devices can seriously degrade performance in this respect. For example, the difference between the two principle refractive indices in silica waveguides which is attributable to strain is typically measured to be about $3 \times 10^{-4}$. An optical signal propagating in a device such as a multiplexer/demultiplexer which incorporates silica waveguides experiences a wavelength dependence on polarization of about 0.3 nm, which is unacceptably large for many applications. In telecommunications wavelength-division multiplexed systems for example, a maximum polarization wavelength dependence of about 0.05 nm is required.

A considerable amount of work has been done on radiolytically induced stress, strain and birefringence in silicate materials, which are known to be photosensitive. In this context a material is described as being photosensitive if its refractive index changes upon irradiation. For example, as demonstrated by Rothschild et al., Appl. Phys. Lett., vol. 55, pp.1276–1278, 1989, it is well known that birefringence may be induced in an isotropic bulk material that initially exhibits no birefringence. Specifically, birefringence can be increased from its initial value of zero by irradiating a limited region of the material. Resulting stress between the irradiated and non-irradiated regions causes birefringence.

Other studies performed on planar waveguides such as reported in Hibino et al., Electon. Lett., vol. 29, pp. 621–623, 1993, indicate that birefringence can be reduced by irradiating the waveguide structure at a wavelength which is absorbed by photosensitive defects in the core material. In particular, Hibino demonstrated that birefringence can be reduced in germanium-doped planar silica waveguides by irradiation with ultraviolet light at a wavelength of 248 nm. This wavelength corresponds to germania-related color center defects that are known to be present in the silica core material. In Hibino, the photosensitivity of the germanium core was enhanced by consolidating the core material in a reducing atmosphere. This technique is well known to facilitate the generation of germanium defects responsible for optical absorption at. 248 nm. Since the cladding composition is presumably a standard phosphorous and boron-doped silica layer, the cladding is essentially transparent to light at 248 nm, with an optical absorption coefficient on the order of 0.1 $cm^{-1}$. By comparison, the optical absorption coefficient of the germanium-doped core layer is on the order of 100 $cm^{-1}$ at this wavelength. FIG. 3 of Hibino indicates that irradiation induces a more rapid change in $n_{TE}$ than in $n_{TM}$. However, the data suggests to those skilled in the art that the photoinduced refractive index changes saturate before $n_{TM}$ is substantially equal to $n_{TE}$, that is, before birefringence is substantially eliminated.

Similar to Hibino, Wong et al., Opt. Lett., 1992, 17, pp. 1773–1775, induced refractive index changes in germanium-doped silica fibers with radiation at 248 nm. More particularly, Wong measured the temperature sensitivity of the birefringence before and after irradiation. Wong demonstrated that the temperature dependence of the birefringence decreases after exposure. Wong proposed a model to explain this phenomenon which implies that birefringence cannot be entirely eliminated. Their model also implies that their process cannot cause the birefringence to change sign.

The photosensitivity of silica materials is sometimes employed to alter the refractive index without affecting the birefringence. For example, Kitagawa et al., Electon. Lett., 1994, 30, p 1311, forms optical gratings by photoinducing through a mask spatially nonuniform refractive index changes in phosphorous-doped silica waveguides. The photoinduced refractive index changes are performed at a wavelength of 193 nm. The waveguides are first loaded with molecular hydrogen to increase their photosensitivity. Kitagawa states that the magnitude of the resulting grating reflectivity was identical for both the TE and TM modes. Since the photoinduced index modulation determines the magnitude of the grating reflectivity, their result implies that the refractive index changes for both the TE and TM modes were identical. Kitagawa thus utilizes isotropic refractive index changes (i.e., index changes that are the same for both the TE and TM modes) to modify the refractive index of distinct waveguide segments so that the resulting device is configured as an optical grating. Consistent with their observations concerning the reflectivity, Kitagawa does not indicate that any anisotropic index changes (i.e., birefringence changes) occur in the waveguides.

While the prior art has reduced birefringence in a single waveguide structure with radiation having a wavelength that is relatively strongly absorbed by the waveguide core, there is no method for selecting an appropriate wavelength that reduces or even eliminates birefringence in a wide variety of waveguides having different core and cladding compositions.

SUMMARY OF THE INVENTION

The inventors of the present invention have discovered that irradiation at selected wavelengths which induce compaction in at least the cladding layer of a silicate waveguide structure may be used to create anisotropic refractive index changes, thus reducing or even eliminating birefringence. Accordingly, in contrast to known methods, the inventive method requires that significant absorption occur in the cladding. This inventive method provides enormous flexibility since birefringence now may be reduced in a wide variety of different waveguide structures by choosing the appropriate irradiation wavelength. Moreover, for reasons that will be detailed below, irradiation at the selected wavelengths can completely remove the effects of birefringence, whereas the known methods apparently can only reduce the birefringence without completely eliminating it.

DETAILED DESCRIPTION

Figure 1:
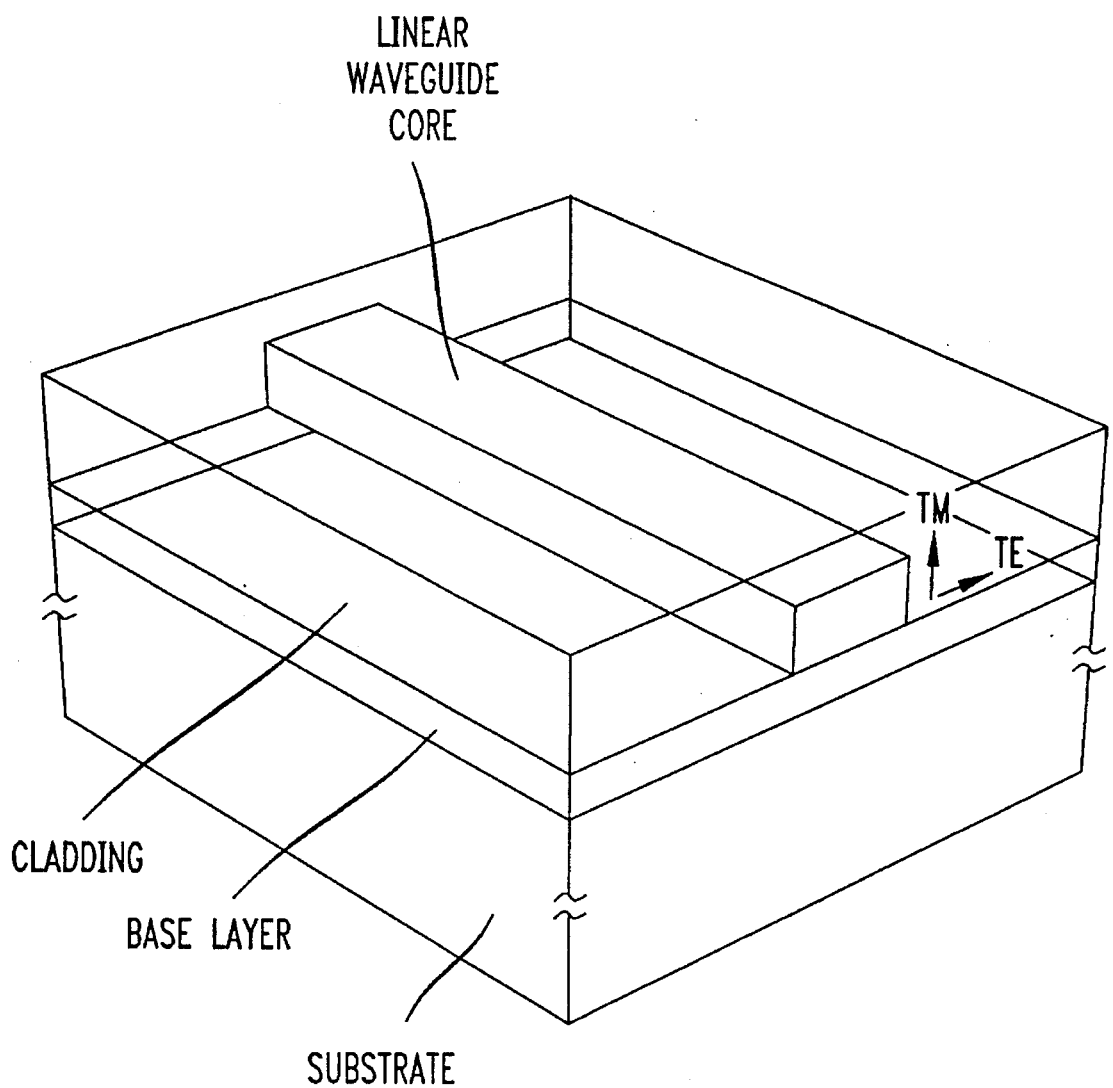
FIG. 1 shows a perspective view of an integrated waveguide formed on a substrate.

The inventive method will be illustrated for phosphorous-doped silicate waveguides fabricated on silicon substrates such as shown in FIG. 1. However, as one of ordinary skill will recognize, the present invention may be applied to silica waveguides with different dopants by appropriately adjusting the various parameters set forth below.

Figure 2:
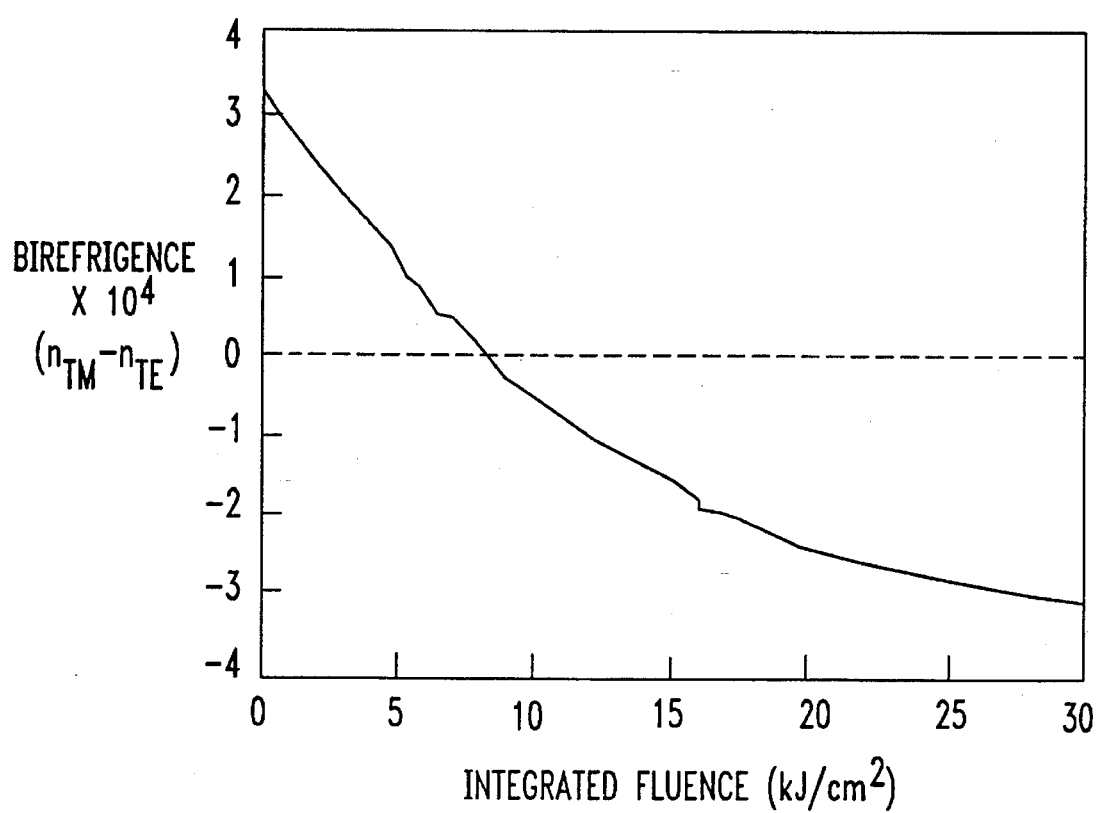
FIG. 2 shows a graph of the birefringence induced by the method of the present invention as a function of the integrated fluence incident upon the waveguide.

In accordance with the present invention, phosphorous-doped silicate waveguides were uniformly exposed to unpolarized ultraviolet radiation at a wavelength of 193 nm from an ArF excimer laser. More specifically, the waveguides had a core doped with 4% phosphous and a BPTEOS cladding doped with 4% boron and 2.5% phosphorous. Both the core and cladding absorb radiation at this wavelength and it was determined that the degree of absorbance by the cladding was similar to or greater than the absorbance by the core. The radiation was pulsed at a repetition rate of 30–100 Hz at fluences of 8–75 mJ/cm$^2$/pulse. FIG. 2 shows a graph of the birefringence as a function of the integrated fluence incident upon the waveguide. As the graph indicates, the refractive index of the TM mode is initially greater than the refractive index of the TE mode prior to exposure. This difference in the refractive indices constitutes birefringence, which has a deleterious effect on waveguide performance. Additional investigations by the inventors have shown that the refractive indices both increased with exposure time and that the TE index increased at a rate 2–5 times faster than the TM index. Accordingly, the difference in the refractive indices, and hence the value of the birefringence, decreased with increasing exposure time until the birefringence was completely eliminated. Exposure beyond this point caused the values of the two refractive indices to diverge. While FIG. 2 shows that until birefringence is eliminated the reduction in birefringence is linearly dependent on irradiation time, it has been determined that the reduction in birefringence is also linearly dependent on the fluence and pulse rate. The polarization state of the ultraviolet radiation did not appear to effect the rate of change of either refractive index.

Figure 3:
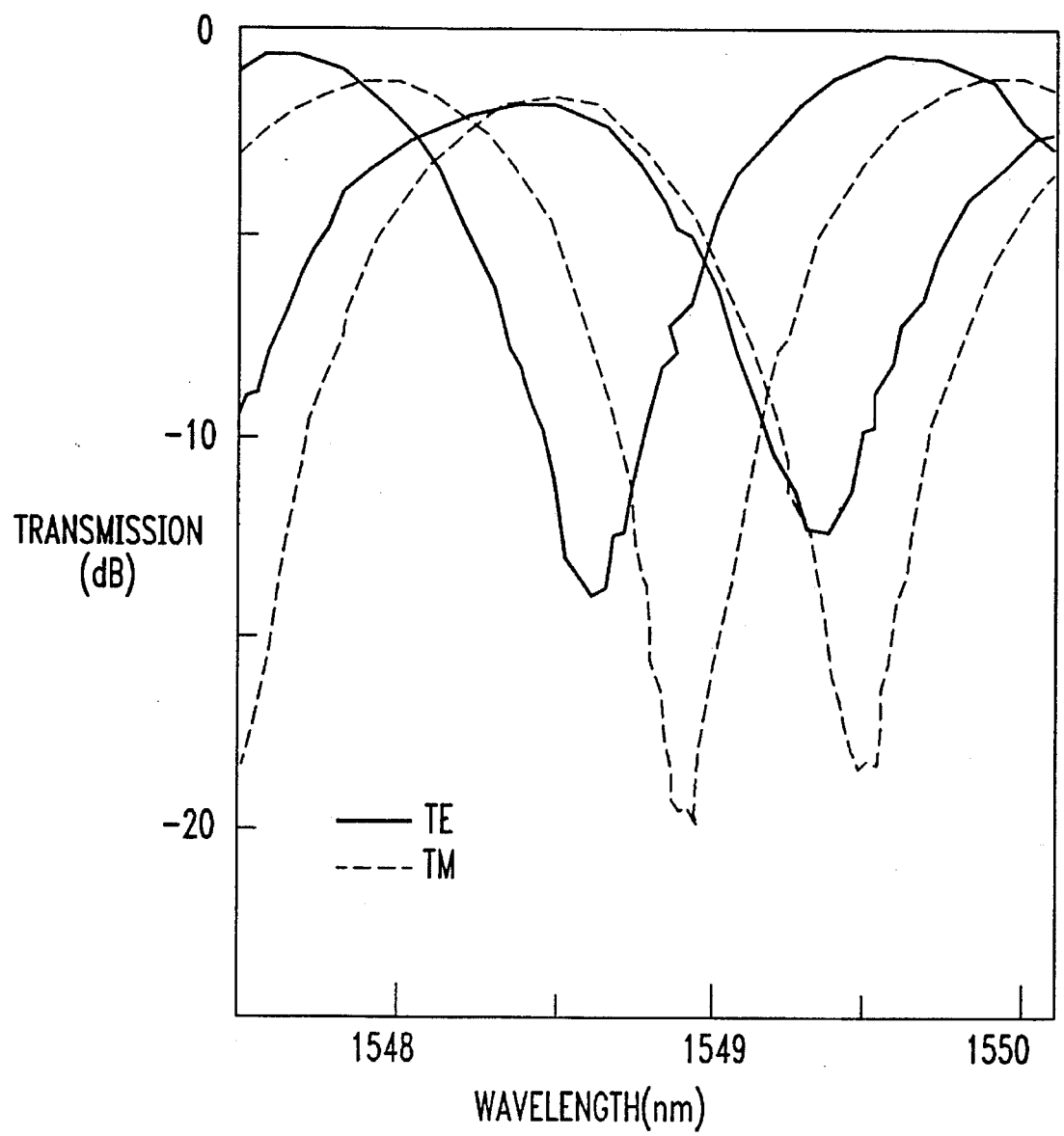
FIG. 3 shows the optical transmission for a Mach-Zehnder waveguide structure as a function of wavelength for the TE and TM modes before and after irradiation.

To further illustrate the invention, a Mach-Zehnder interferometer fabricated from phosphosilicate waveguides was uniformly irradiated for one hour at a wavelength of 193 nm, a flux of 25 mJ/cm$^2$, and a repetition rate of 50 Hz. FIG. 3 shows the optical transmission of the device as a function of wavelength for the TE and TM modes before and after irradiation. The arms of the interferometer were of unequal length so that sharp and narrow interference peaks were produced that were capable of resolving the different spectral positions of the TE and TM modes. The birefringence prior to irradiation as determined from an analysis of the interference peaks was $3.0\times10^{-4}$. After irradiation the birefringence was reduced to $1.3\times10^{-4}$, a decrease of approximately 60%. The refractive index changes for both the TE and TM modes were consistent with FIG. 2. Similar results have been achieved with an excimer uv lamp operating at 172 nm rather than with a laser. Such lamps are available from Heraeus Nobelight, Inc, for example.

Figure 4:
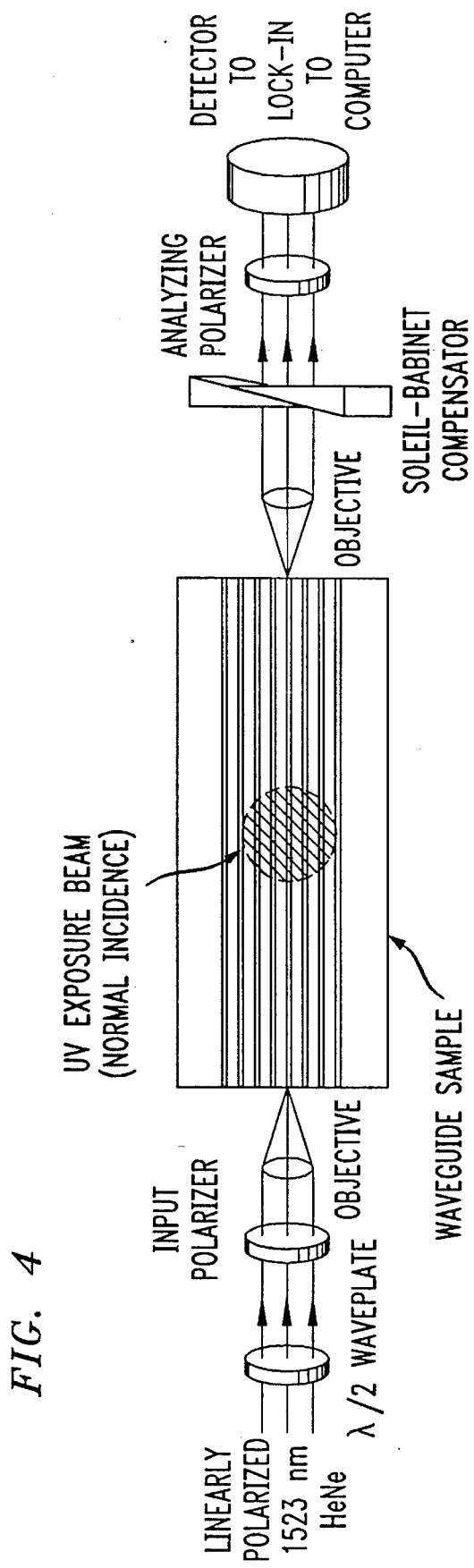
FIG. 4 shows an arrangement used to measure birefringence in waveguide structures.

Additional measurements on linear waveguides have demonstrated that the birefringence can be reduced through zero and caused to change sign so that $n_{TE}>n_{TM}$. FIG. 4 shows the arrangement used to measure birefringence. A probe beam composed of linearly polarized light with a wavelength of 1.5 microns was launched into a phosphorous-doped linear waveguide prior to irradiation. The polarization of the probe beam was oriented at a 45 degree angle with respect to the principle refractive indices TE and TM of the waveguide. The probe beam passed through a polarization compensator and an optical polarizer after emerging from the waveguide. These components allowed a complete analysis of the polarization state of the probe beam as it emerged from the waveguide. The waveguide was next irradiated through the cladding in accordance with the present invention at a wavelength of 193 nm. The single shot laser fluence was 50 mJ/cm$^2$ and the repetition rate was 30 Hz.

As indicated by the example above, the present invention selects an appropriate irradiation energy (or equivalently, wavelength) at which to expose the waveguides. The inventors have discovered that the wavelength selected must be sufficient to produce significant compaction (i.e., an increase in density) in at least the cladding layer. The selected wavelength may also produce significant compaction in the core, but this is not required by the present invention. Appropriate wavelengths which produce compaction in the cladding layer of a given waveguide can be determined by any technique desired, including an empirical technique in which various wavelengths are used and the resulting compaction measured. However, the task of selecting appropriate wavelengths is simplified by recognizing that wavelengths which induce compaction correspond to wavelengths that undergo electronic absorption in the cladding layer.

Figure 5:
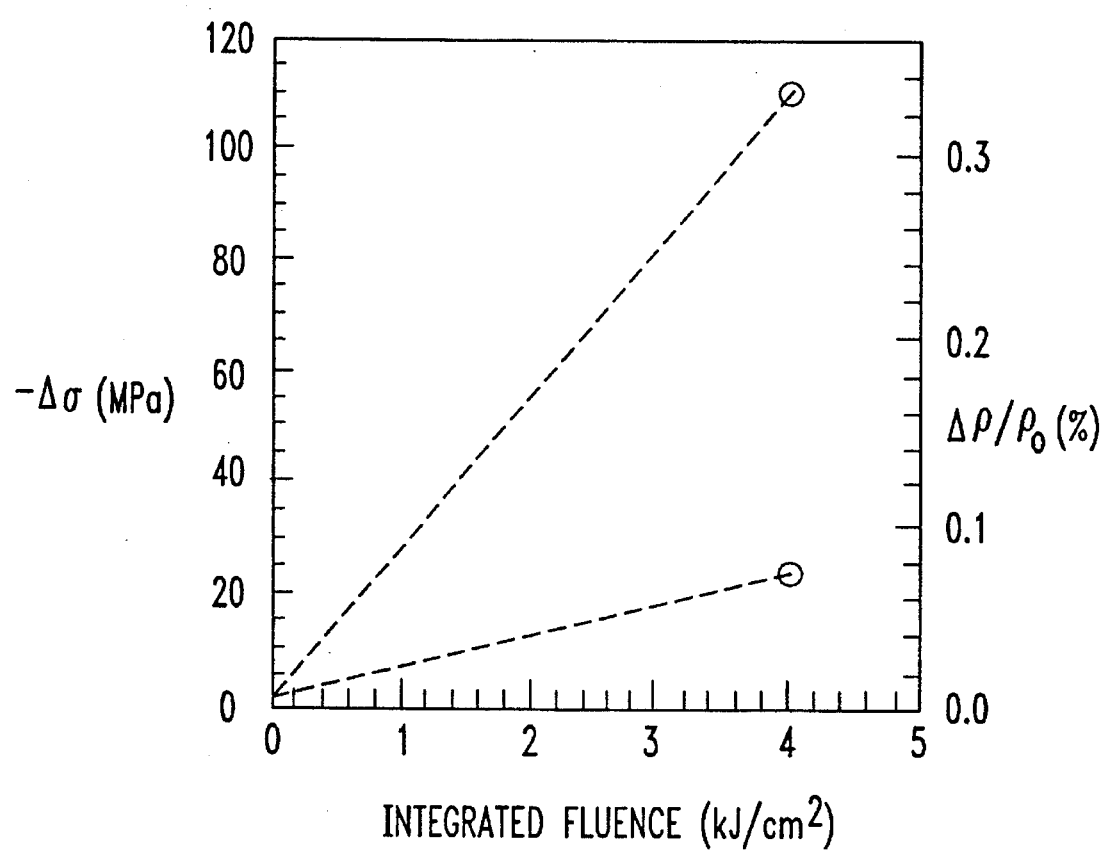
FIG. 5 shows experimental data illustrating the degree of compaction induced by radiation for a sample comprising a phosphorous-doped silica layer on a silicon substrate and a sample comprising a BPTEOS layer on a silicon substrate.

Radiation-induced compaction may be measured by a wafer curvature technique, o such as disclosed in C. A. Volken, J. Appl. Phys., 70, 3527, 1991. To determine the degree of compaction in the core and cladding layers, separate samples are prepared consisting of core material deposited on a substrate such as silicon and cladding material deposited on a different substrate of the same material. Subsequent to sample fabrication, the amount of wafer curvature due to the thermal expansion mismatch between the substrates and the overlayers is optically measured for both samples at ambient temperature. The samples are then irradiated and the wafer curvature is measured for a second time. Changes in wafer curvature can be related in a straightforward manner to density changes in the samples. FIG. 5 shows the change in density as determined by this procedure for a sample comprising a phosphorous-doped silica layer on a silicon substrate (corresponding to the core layer of the waveguide) and a sample comprising a BPTEOS layer on a silicon substrate (corresponding to the cladding layer of the waveguide).

The inventors have mathematically modeled the above compaction process using finite element analysis and have determined that birefringence is most effectively reduced in planar silica waveguides when the cladding layer compacts at an accelerated rate in comparison to the core layers. In fact, the inventors have determined that birefringence can be eliminated with even negligible compaction in the core as long as the cladding undergoes sufficient compaction. FIG. 5 shows that this is indeed what occurs for the particular materials and wavelength employed in that example of the inventive method. The inventors have further determined that the induced compaction should have a value of approximately at least 0.1%–0.5% in the cladding layer to effectively eliminate the birefringence that typically arises in silica planar waveguides. To induce this requisite degree of compaction, the wavelength of radiation employed should induce electronic transitions throughout the cladding with some minimal degree of uniformity. This uniformity can be achieved by transmitting as little as 1% of the radiation through the cladding. Higher transmission values may also be used, as long as the requisite amount of compaction is achieved.

In contrast to the present invention, prior methods of reducing birefringence such as disclosed by Hibino et al., which was discussed above, employ radiation specifically chosen to have a wavelength that is primarily absorbed in the waveguide core material, with little or no absorption (and hence no compaction) occurring in the cladding layer. Furthermore, Hibino's data suggests that irradiation at energies corresponding to defect absorption in the core material can reduce but not eliminate birefringence. This limitation of the prior method is suggested by FIG. 3 of Hibino, which would lead one of ordinary skill in the art to believe that the refractive index changes saturate after a period of exposure to radiation. It is not surprising that this known method fails to completely eliminate birefringence because compaction of the cladding layer did not occur to any substantial degree. On the other hand, irradiation at the wavelengths employed by the present invention induces significant compaction in both the core and cladding layers, which more completely and uniformly reduces strain, which in turn reduces the birefringence.

It was noted above in connection with the Kitagawa reference that Kitagawa did not observe any changes in birefringence upon irradiation in a spatially nonuniform manner at a wavelength of 193 nm. This result is not surprising because due to the particular details of their waveguide preparation, the cladding in all likelihood did not undergo compaction. More specifically, it was noted above that Kitagawa loaded the waveguides with hydrogen to increase their photosensitivity. As discussed in J. E. Shelby, J. Appl. Phys., 50, 3702 (1979), hydrogen impregnated silica undergoes a density decrease upon exposure to radiation, not a density increase. Thus Kitagawa failed to induce compaction in the cladding layer as required by the inventive method.

Reductions in birefringence induced by radiation can exhibit significant decay over time. The rate of decay increases with increasing temperature. More particularly, the fraction of the birefringence reduction that decays over time is given by the following power law:

$$\eta = (1 + (t/\tau)^\alpha)^{-1}$$

where t is the time subsequent to irradiation and $\alpha$ and $\tau$ are temperature-dependent parameters describing the decay behavior. A consequence of this behavior is that the rate of decay becomes negligibly small in comparison to the lifetime of the device after a period of time has elapsed. It has been determined that this period of time can be reduced by annealing the irradiated device at elevated temperatures. Accordingly, a stable device may be fabricated by annealing the device after exposing it to radiation.

This decay behavior also suggests a technique for eliminating birefringence in an extremely precise manner. First, the device may be overexposed so that the birefringence passes through zero and changes sign so that $n_{TE} > n_{TM}$ (see FIG. 2). The device is then annealed so that the birefringence stabilizes at a reduced value ideally equal to zero. Thus both the irradiation step and the annealing step are tailored to determine the precise reduction in birefringence that is imparted to the device. Prior irradiation methods cannot control the birefringence this precisely because as noted above they cannot induce a change in the sign of the birefringence.

The inventors have surprisingly discovered that the irradiation and annealing steps may be performed simultaneously rather than sequentially. It has been determined that if the steps are performed simultaneously the device does not experience further decay upon returning to ambient temperature. Moreover, the requisite irradiation time does not increase at elevated temperatures and thus by performing these steps simultaneously the total time required by the inventive method is minimized.

Figure 6:
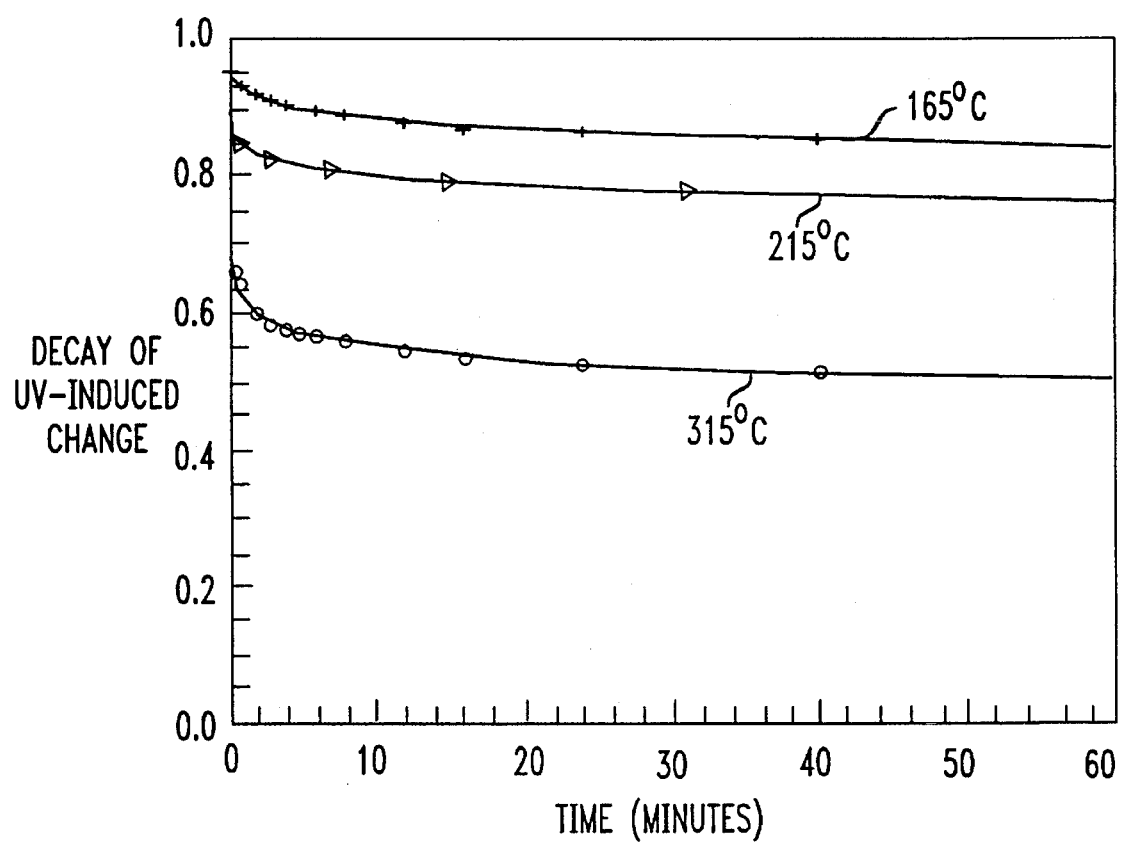
FIG. 6 shows the rate at which the induced birefringence decays over time at various temperatures.

The experimental data in FIG. 6 shows the rate at which radiation-induced birefringence decays at various temperatures. The irradiated device was shown to be stable for most practical purposes by first annealing it at a high temperature. Waveguides that underwent simultaneous irradiation and annealing during the fabrication process were subsequently subjected to elevated temperatures below the fabrication temperature. These waveguides demonstrated negligible thermal decay.

The inventive method discussed above employs ultraviolet radiation to reduce birefringence. As one of ordinary skill in the art will recognize, other forms of radiation may be employed which are consistent with the parameters set forth above such as the ability to create electronic excitations in at least the waveguide cladding to produce compaction while achieving the requisite degree of absorptive uniformity. Such radiation includes other forms of electromagnetic radiation such as x-rays and even ionized particles such as proton beams.

In regard to particle beams, the inventors have employed protons with energies of 1.5 Mev and 2.5 Mev to reduce birefringence in phosphorous-doped silica waveguides. In the case of particles the required energy is not determined by the optical absorption of the material but rather by the material's "stopping power". Accelerated particles give up their kinetic energy as they penetrate into the material. The distance that the particles can travel before coming to a stop is determined by the details of the interactions between the particles and the target, which in this case are the waveguide materials. Various models are known which can predict these deposition profiles and data has been compiled for many technologically important materials and ion beams, such as in B. Smith, "Ion Implantation Range Data for Silicon and Germanium Device Technologies," Forest Grove, Oregon, USA, Research Studies Press, Inc., for example. This data can be used to select an appropriate ion and ion energy which is capable of penetrating sufficiently deep into the waveguide core to achieve a reduction in birefringence by excitation of both the core and cladding. The models may also be used to determine the fraction of the energy that is partitioned between electronic and nuclear excitations. Only energy that is deposited as electronic energy serves to reduce birefringence.

In general, if particles are to be capable of penetrating the requisite distance through the cladding to reduce birefringence, they must have a kinetic energy orders of magnitude above the optical absorption edge of the material. The optical absorption edge of a material is the energy range over which optical absorption increases exponentially. For example, 2.5 Mev protons will penetrate approximately 67 microns into pure amorphous silica, shedding 22 Kev per micron in the form of electronic energy.

We claim:

1. A method for reducing birefringence in a silicate waveguide structure having a waveguide core and cladding, said method comprising the step of:

selecting an irradiation energy that induces compaction in the cladding;

irradiating the waveguide structure with radiation having an energy equal to said irradiation energy to induce a reduction in birefringence.

2. The method of claim 1 wherein the energy selecting step comprises the step of selecting an irradiation energy sufficient to induce at least 0.1% compaction in the cladding.

3. The method of claim 1 wherein the energy selecting step comprises the step of selecting an irradiation energy sufficient to induce at least 0.1%–0.5% compaction in the cladding.

4. The method of claim 1 wherein said irradiation energy corresponds to ultraviolet radiation.

5. The method of claim 1 wherein said waveguide core is composed of phosphorous-doped silica and said irradiation energy corresponds to ultraviolet radiation.

6. The method of claim 5 wherein said irradiation energy has a wavelength of 193 nm.

7. The method of claim 1 wherein the step of irradiating the waveguide structure is performed for a period of time sufficient to eliminate birefringence.

8. The method of claim 2 wherein said irradiation energy is further selected to induce compaction in the core at a rate less than in the cladding.

9. The method of claim 4 wherein said radiation is provided by an excimer uv lamp.

10. The method of claim 1 further comprising the step of annealing said waveguide structure.

11. The method of claim 10 wherein the annealing step is performed simultaneous with the irradiation step.

12. The method of claim 10 wherein the annealing step is performed subsequent to the irradiation step.

13. The method of claim 1 further comprising the step of:

overexposing the waveguide structure to the irradiation energy so that a change in sign of the birefringence is induced relative to its value prior to irradiation;

annealing the waveguide structure until the birefringence is reduced.

14. The method of claim 13 wherein the annealing step is performed until the birefringence is eliminated.

15. A method for reducing birefringence in a silicate waveguide structure having a waveguide core and cladding, said cladding having an optical absorption edge defining an energy range over which optical absorption increases exponentially, said method comprising the step of:

selecting an irradiation energy above said energy range defined by said optical absorption edge of the waveguide cladding;

irradiating the waveguide structure with ionized particles having an energy equal to said irradiation energy such that a reduction in birefringence is induced.

16. The method of claim 15 wherein said particles comprise protons.

17. The method of claim 15 wherein said silicate waveguide structure has a core composed of phosphorous-doped silica and said radiation comprises protons having an energy at least equal to 1.5 Mev.

18. A silicate waveguide structure having a waveguide core and cladding, said structure fabricated by a method including the steps:

selecting an irradiation energy that induces compaction in the cladding;

irradiating the waveguide structure with radiation having an energy equal to said irradiation energy to induce a reduction in birefringence.

19. The structure of claim 18 wherein the energy selecting step comprises the step of selecting an irradiation energy sufficient to induce at least 0.1% compaction in the cladding.

20. The structure of claim 18 wherein the energy selecting step comprises the step of selecting an irradiation energy sufficient to induce at least 0.1%–0.5% compaction in the cladding.

21. The structure of claim 18 wherein said irradiation energy corresponds to ultraviolet radiation.

22. The structure of claim 18 wherein said waveguide core is composed of phosphorous-doped silica and said irradiation energy corresponds to ultraviolet radiation.

23. The structure of claim 22 wherein said irradiation energy has a wavelength of 193 nm.

24. The structure of claim 18 wherein the step of irradiating the waveguide structure is performed for a period of time sufficient to eliminate birefringence.

25. The structure of claim 19 wherein said irradiation energy is further selected to induce compaction in the core at a rate less than in the cladding.

26. The structure of claim 18 wherein said waveguide core and cladding are disposed on a silica substrate and further comprising the step of irradiating said waveguide structure through the substrate.

27. The structure of claim 18 further comprising the step of annealing said waveguide structure.

28. The structure of claim 27 wherein the annealing step is performed simultaneous with the irradiation step.

29. The structure of claim 27 wherein the annealing step is performed subsequent to the irradiation step.

30. The structure of claim 18 further comprising the step of:

overexposing the waveguide structure to the irradiation energy so that a change in sign of the birefringence is induced relative to its value prior to irradiation;

annealing the waveguide structure until the birefringence is reduced.

31. The structure of claim 30 wherein the annealing step is performed until the birefringence is eliminated.

32. A silicate waveguide structure having a waveguide core and cladding, said cladding having an optical absorption edge defining an energy range over which optical absorption increases exponentially, said structure fabricated by a method comprising the steps of:

selecting an irradiation energy above said energy range defined by said optical absorption edge of the waveguide cladding;

irradiating the waveguide structure with ionized particles having an energy equal to said irradiation energy such that a reduction in birefringence is induced.

33. The structure of claim 32 wherein said particles comprise protons.

34. The structure of claim 32 wherein said silicate waveguide structure has a core composed of phosphorous-doped silica and said radiation comprises protons having an energy at least equal to 1.5 Mev.

* * * * *